(12) United States Patent
Liu et al.

(10) Patent No.: US 11,151,571 B2
(45) Date of Patent: Oct. 19, 2021

(54) METHOD AND SYSTEM FOR PROCESSING RESOURCE EXCHANGE INFORMATION

(71) Applicant: Tencent Technology (Shenzhen) Company Limited, Shenzhen (CN)

(72) Inventors: Kai Liu, Shenzhen (CN); Liangliang Fan, Shenzhen (CN); Leteng Weng, Shenzhen (CN); Yaxuan Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 824 days.

(21) Appl. No.: 15/190,021

(22) Filed: Jun. 22, 2016

(65) Prior Publication Data

US 2016/0321660 A1 Nov. 3, 2016

Related U.S. Application Data

(63) Continuation of application No. PCT/CN2015/070335, filed on Jan. 8, 2015.

(30) Foreign Application Priority Data

Jun. 5, 2014 (CN) .......................... 201410247995.1

(51) Int. Cl.
*G06Q 20/40* (2012.01)
*H04W 12/06* (2021.01)
(Continued)

(52) U.S. Cl.
CPC ........... *G06Q 20/405* (2013.01); *G06Q 10/00* (2013.01); *G06Q 20/3226* (2013.01);
(Continued)

(58) Field of Classification Search
CPC ............. G06Q 20/405; G06Q 20/3226; G06Q 20/3276; G06Q 20/34; G06Q 20/3829;
(Continued)

(56) References Cited

U.S. PATENT DOCUMENTS

2002/0087867 A1\* 7/2002 Oberle .................. G07F 7/1008
713/183
2010/0106649 A1\* 4/2010 Annan ............... G06Q 20/3674
705/67
(Continued)

FOREIGN PATENT DOCUMENTS

CN 1399216 A 2/2003
CN 102096967 A 6/2011
(Continued)

OTHER PUBLICATIONS

Tencent Technology, ISRWO, PCT/CN2015/070335, Apr. 16, 2015, 7 pgs.

(Continued)

*Primary Examiner* — Jay Huang
*Assistant Examiner* — Courtney P Jones
(74) *Attorney, Agent, or Firm* — Morgan, Lewis & Bockius LLP

(57) ABSTRACT

A computer-implement method of processing resource exchange information includes the following steps: obtaining a data package including a user card identifier and a social network application identifier from a mobile phone; establishing a correspondence between the user card identifier and the social network application identifier and storing the correspondence in the computer system; obtaining user card data and resource exchange information from a payment terminal, wherein the user card data includes the user card identifier; performing security verification to the user card data and obtaining the corresponding social net- (Continued)

work application identifier when the security verification succeeds; processing a resource transfer request according to the social network application identifier and the resource exchange information and generating corresponding processing state information; and returning the corresponding processing state information to the payment terminal.

17 Claims, 10 Drawing Sheets

(51) Int. Cl.
| | |
|---|---|
| *G06Q 30/00* | (2012.01) |
| *H04W 12/10* | (2021.01) |
| *G06Q 20/32* | (2012.01) |
| *G06Q 20/34* | (2012.01) |
| *G06Q 20/38* | (2012.01) |
| *G06Q 50/00* | (2012.01) |
| *H04W 4/24* | (2018.01) |
| *G06Q 10/00* | (2012.01) |
| *H04L 29/06* | (2006.01) |
| *H04M 15/00* | (2006.01) |
| *H04W 12/61* | (2021.01) |

(52) U.S. Cl.
CPC ......... *G06Q 20/3276* (2013.01); *G06Q 20/34* (2013.01); *G06Q 20/3829* (2013.01); *G06Q 30/00* (2013.01); *G06Q 50/01* (2013.01); *H04L 63/0869* (2013.01); *H04M 15/48* (2013.01); *H04W 4/24* (2013.01); *H04W 12/06* (2013.01); *H04W 12/10* (2013.01); *H04L 63/123* (2013.01); *H04W 12/61* (2021.01)

(58) Field of Classification Search
CPC .. H04L 63/0869; H04L 63/123; H04M 15/48; H04W 12/06; H04W 12/10
See application file for complete search history.

(56) References Cited

U.S. PATENT DOCUMENTS

| | | | | |
|---|---|---|---|---|
| 2011/0137797 | A1* | 6/2011 | Stals | G06Q 20/02 |
| | | | | 705/44 |
| 2013/0185354 | A1* | 7/2013 | Seligstein | A63F 13/655 |
| | | | | 709/204 |
| 2014/0081783 | A1* | 3/2014 | Paranjape | G06Q 20/20 |
| | | | | 705/21 |
| 2014/0214670 | A1* | 7/2014 | McKenna | G06Q 20/4014 |
| | | | | 705/44 |
| 2014/0249968 | A1* | 9/2014 | MacKinnon Keith | |
| | | | | G06Q 20/3821 |
| | | | | 705/26.82 |
| 2014/0304157 | A1* | 10/2014 | Bachenheimer | G06Q 20/4016 |
| | | | | 705/44 |
| 2015/0170148 | A1* | 6/2015 | Priebatsch | G06Q 20/4016 |
| | | | | 705/44 |
| 2015/0193774 | A1* | 7/2015 | Wetzel | G06Q 50/01 |
| | | | | 705/44 |
| 2015/0213435 | A1* | 7/2015 | Douglas | G06Q 20/3278 |
| | | | | 705/64 |
| 2015/0287031 | A1* | 10/2015 | Radu | G06Q 20/20 |
| | | | | 705/18 |

FOREIGN PATENT DOCUMENTS

| | | |
|---|---|---|
| CN | 102376131 A | 3/2012 |
| CN | 102509219 A | 6/2012 |
| CN | 103150853 A | 6/2013 |
| CN | 103268550 A | 8/2013 |
| CN | 104038924 A | 9/2014 |

OTHER PUBLICATIONS

Tencent Technology, IPRP, PCT/CN2015/070335, Dec. 6, 2016, 5 pgs.

* cited by examiner

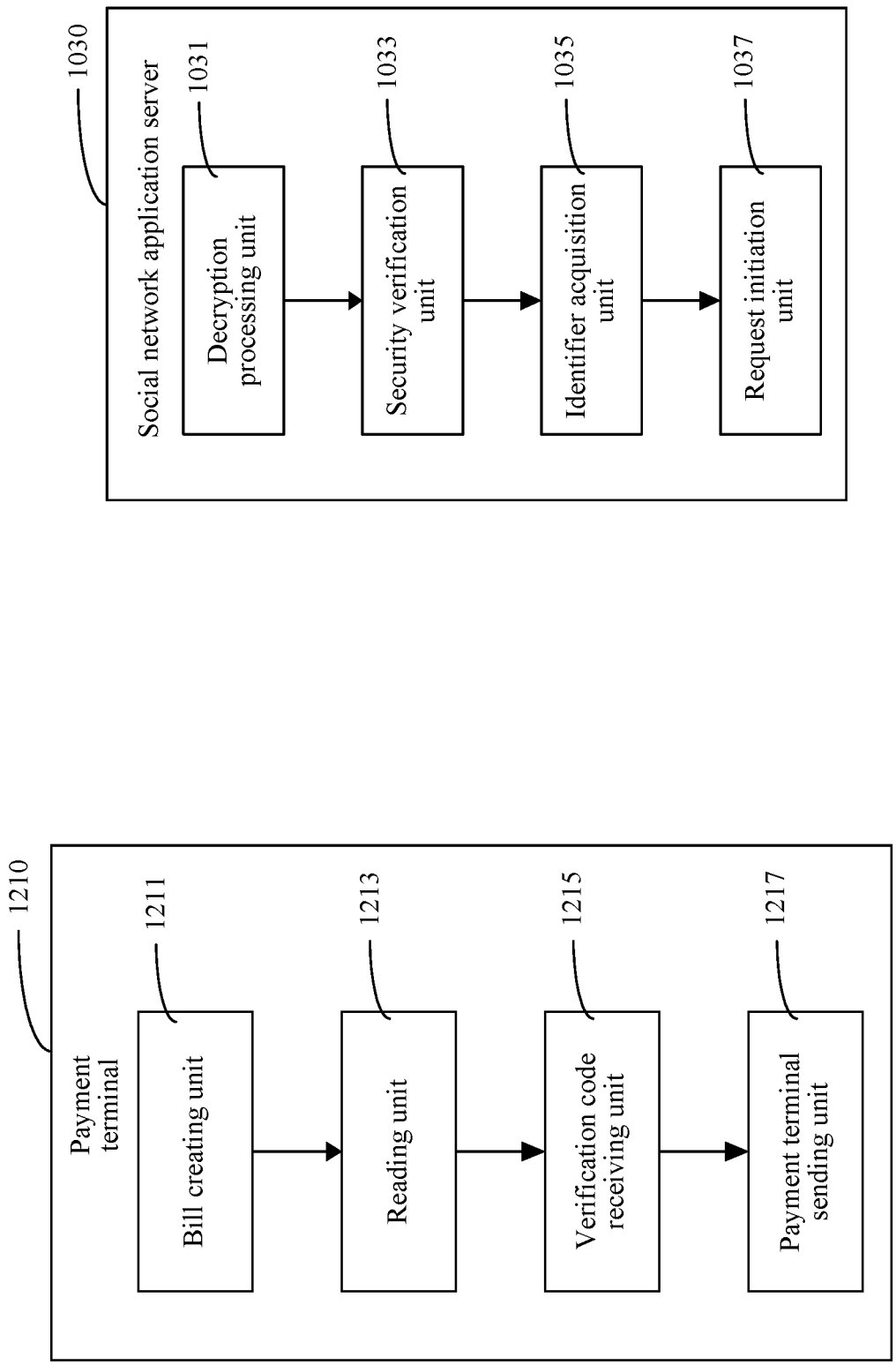

METHOD AND SYSTEM FOR PROCESSING RESOURCE EXCHANGE INFORMATION

RELATED APPLICATIONS

This application is a continuation application of PCT Patent Application No. PCT/CN2015/070335, entitled "METHOD AND SYSTEM FOR PROCESSING RESOURCE EXCHANGE INFORMATION" filed on Jan. 8, 2015, which claims priority to Chinese Patent Application No. 201410247995.1, entitled "METHOD AND SYSTEM FOR PROCESSING RESOURCE EXCHANGE INFORMATION" filed on Jun. 5, 2014, both of which are incorporated by reference in their entirety.

TECHNICAL FIELD

The present application relates to computer networking technologies, and in particular, to method and system for processing resource exchange information.

BACKGROUND

With the development of mobile Internet technologies, users can use mobile payment applications on mobile phones to make payment anytime and anywhere. For example, when payment is made for purchasing in a supermarket, a two-dimensional code is generated at a cashier desk, and a user uses a mobile phone to scan the two-dimensional code to obtain website information about payment, and then performs online payment operations by using a mobile payment application on the mobile phone.

Conventionally, the mobile phone can only perform the payment operations when it is located in a network environment or in an online state. When the mobile phone is in an offline state, the user cannot use the mobile payment application because the mobile phone cannot upload data to perform any payment-related operations.

SUMMARY

The above deficiencies and other problems associated with the conventional approach of mobile payment applications are reduced or eliminated by the present application disclosed below. In some embodiments, the present application is implemented in a computer system that has one or more processors, memory and one or more modules, programs or sets of instructions stored in the memory for performing multiple functions. Instructions for performing these functions may be included in a computer program product configured for execution by the computer system.

In accordance with some embodiments of the present application, a computer-implemented method for processing resource exchange information is performed at a computer system having one or more processors and memory for storing program modules to be executed by the processors. The method includes: obtaining a data package including a user card identifier and a social network application identifier from a mobile phone; establishing a correspondence between the user card identifier and the social network application identifier and storing the correspondence in the computer system; obtaining user card data and resource exchange information from a payment terminal, wherein the user card data includes the user card identifier; performing security verification to the user card data and obtaining the corresponding social network application identifier when the security verification succeeds; processing a resource transfer request according to the social network application identifier and the resource exchange information and generating corresponding processing state information; and returning the corresponding processing state information to the payment terminal. In accordance with some embodiments of the present application, a computer system includes one or more processors; memory; and one or program modules stored in the memory for performing the method mentioned above. In accordance with some embodiments of the present application, a non-transitory computer readable storage medium stores one or more program modules configured for execution by a computer system that includes one or more processors and memory for performing the method mentioned above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

FIG. 13 is a schematic structural diagram of a payment terminal in FIG. 12;

FIG. 14 is a schematic structural diagram of a social network application server according to some embodiments;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application more comprehensible, the present application is described in further detail below with reference to the accompanying drawings and embodiments. It should be understood that, the specific embodiments described herein are merely used for explaining the present application, instead of limiting the present application.

Figure 1:
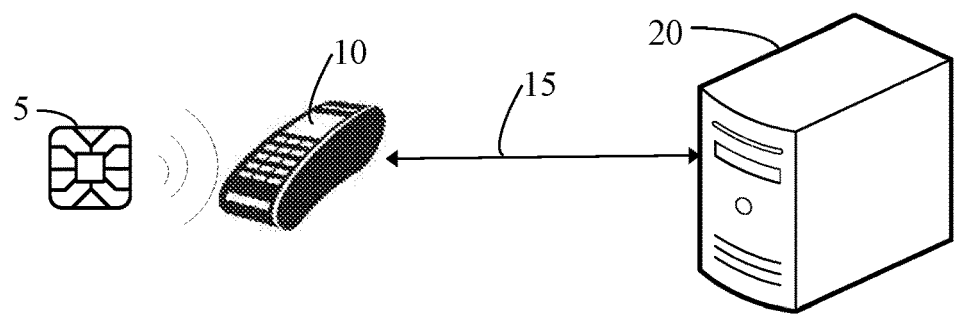
FIG. 1 is a schematic structural diagram of a computer system for processing resource exchange information according to some embodiments.

In some embodiments, a method for processing resource exchange information is provided, and a computer system in which the method is performed is shown in FIG. 1. The computer system includes a payment terminal 10 and a server 20. There is a network connection 15 between the payment terminal 10 and the server 20.

The payment terminal 10 is a card reader, and interacts with a user card 5 possessed by a user, to read data stored in the user card 5. Note that interaction between the payment terminal 10 and the user card may or may not involve physical contact. In this example, there is a wireless communication channel between the user card 5 and the payment terminal 10. In some embodiments, the payment terminal 10 may be a mobile phone. The server 20 interacts with the payment terminal 10 via the network connection 15.

Figure 2:
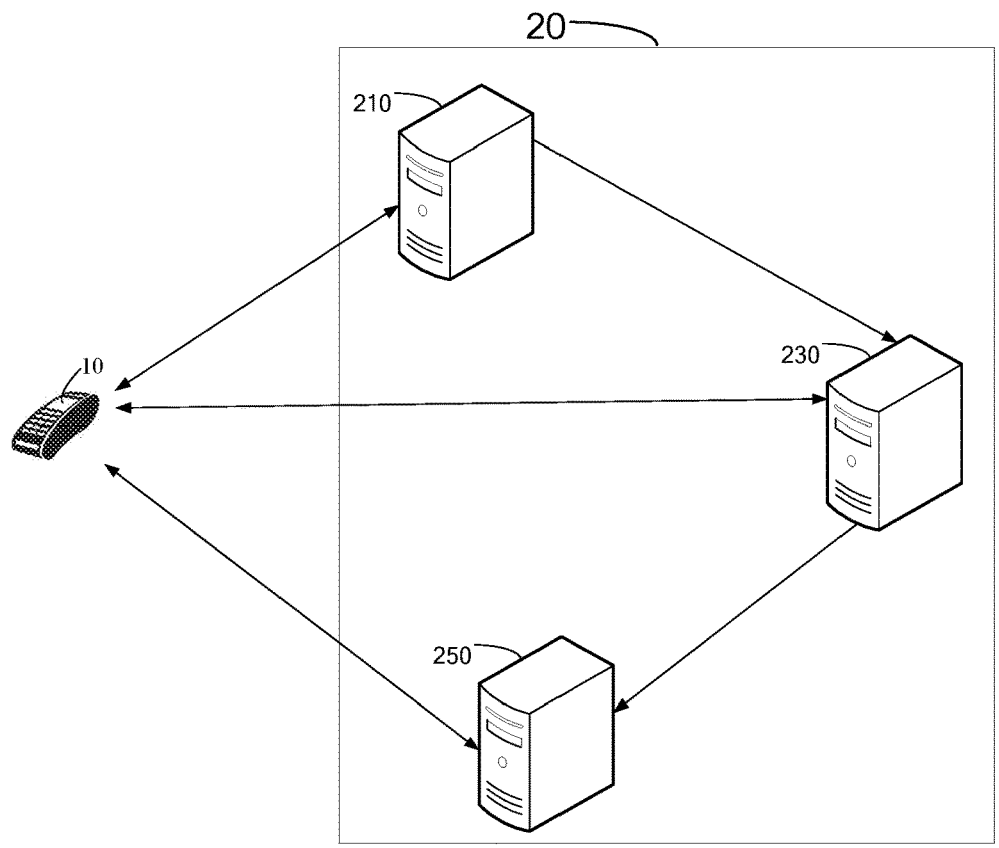
FIG. 2 is a schematic structural diagram of a computer system for processing resource exchange information according to another embodiment.

In a specific implementation, as shown in FIG. 2, the server 20 further includes an access server 210, a social network application server 230, and a resource transfer server 250. The access server 210 may be a server set by a merchant, or may also be a third-party merchant server. The social network application server 230 is a server corresponding to a social network application that is run in a mobile phone of a user.

It should be noted that, when the method for processing resource exchange information is performed by the computer system, a mobile phone of the user of the user card 5 is typically in an offline state.

In addition, in a specific implementation, the server 20 is implemented by using the access server 210, the social network application server 230, and the resource transfer server 250, which facilitates use of an existing architecture, for example, the existing social network application server 230 or resource transfer server 250 may be used to form an architecture of the entire computer system.

Figure 3:
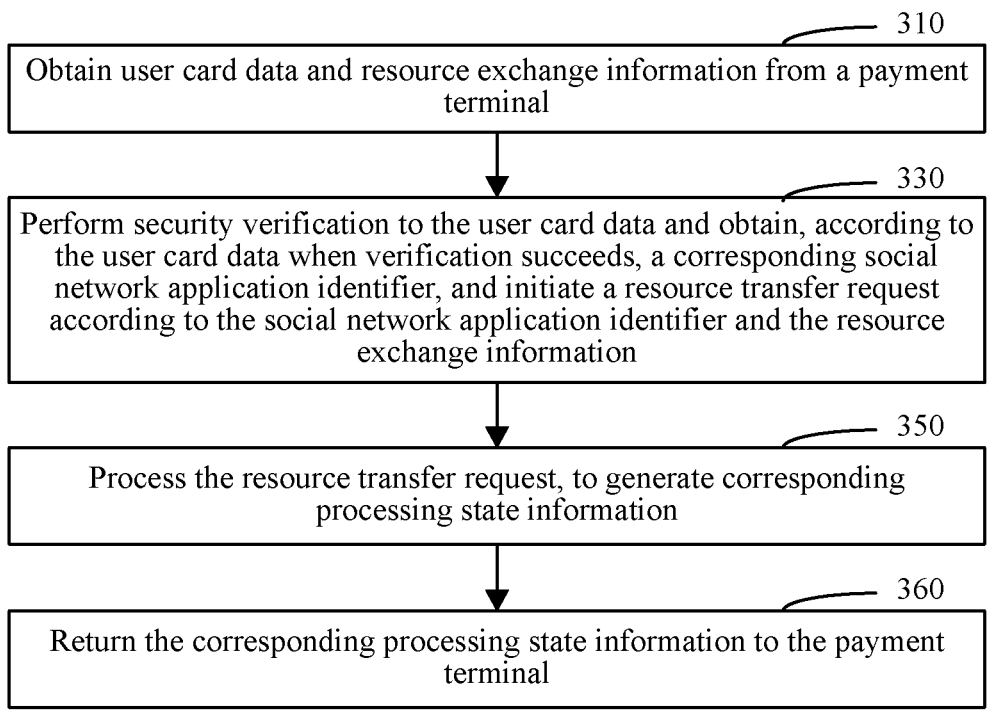
FIG. 3 is a flowchart of a method for processing resource exchange information according to some embodiments.

In this embodiment, as shown in FIG. 3, the method performed by the server 20 includes the following steps:

Step 310: Obtain user card data and resource exchange information from a payment terminal.

In this embodiment, from the payment terminal, a server acquires the user card data and the resource exchange information, where the user card data is used for uniquely identifying a user card and ensuring authority of the user card, and the resource exchange information includes corresponding merchant information, goods information, transaction information, and the like when a resource transfer operation is performed by a user, and is obtained according to information provided by the payment terminal and goods information input when the user triggers the resource transfer operation.

In a specific implementation, a server acquiring the user card data and the resource exchange information may be the access server 210, and the access server 210 may be set as currently required, and performs data exchange with the payment terminal.

Step 330: Perform security verification to the user card data and obtain, according to the user card data when verification succeeds, a corresponding social network application identifier, and initiate a resource transfer request according to the social network application identifier and the resource exchange information.

In this embodiment, the server performs security verification, so as to determine a corresponding user card is an authorized user card. If the server determines that the user card is an authorized user card, the server acquires, according to the user card data, a corresponding social network application identifier to the user card, and then initiates a resource transfer request to a resource transfer server according to the social network application identifier and the resource exchange information.

Further, each user card is uniquely corresponding to a social network application identifier, and the correspondence thereof is stored in the server.

In a preferred embodiment, the user card data includes a user card identifier, and a two-dimensional code corresponding to the user card identifier is preset for the user card. Before using the user card for the first time, the user uses a social network application running in a mobile phone to scan the two-dimensional code to identify the user card identifier corresponding to the two-dimensional code and sends a data package including the, so as to associate the user card with the social network application identifier of the user, establish a correspondence between the user card identifier and the social network application identifier of the user, and store the correspondence in the server.

Further, the server performing security verification on the user card data and initiating the resource transfer request may be a social network application server. Correspondingly, the correspondence established between the user card identifier and the social network application identifier of the user is also stored in the social network application server.

The social network application server is a server corresponding to a social network application, and therefore, the social network application server itself stores massive social network application identifiers. The access server obtains the user card data and the resource exchange information from the payment terminal, and when the user card data and the resource exchange information are sent to the social network application server, the social network application server can directly obtain a corresponding social network application identifier after security verification succeeds, without performing extra acquisition operations. For the social network application server needing to process massive data, the load of the server is significantly lowered, and the processing speed is also improved.

Step 350: Process the resource transfer request and generate corresponding processing state information.

In this embodiment, the resource transfer request initiated by the social network application server is processed according to the social network application identifier and the resource exchange information, and corresponding processing state information is generated as the processing is completed. The processing state information includes resource transfer success information or resource transfer failure information.

In a specific implementation, a server processing the resource transfer request to generate the corresponding processing state information may be the resource transfer server. Further, an existing resource transfer server may further be used instead of setting a new server. Therefore, in a specific implementation, the social network application server and the resource transfer server are used so that the foregoing method for processing resource exchange information can be integrated into an existing system architecture, which greatly reduces the costs and time that need to be consumed.

Step 360: Return the corresponding processing state information to the payment terminal.

In this embodiment, the payment terminal obtains the processing state information and determines whether the resource transfer request succeeds or not and then prompts the merchant accordingly. In some embodiments, the server also returns the processing state information to the mobile phone that is associated with the social network application identifier so that the user of the user card and the mobile phone has a record of the resource transfer for reference. The server may do so when the mobile phone is back in an online state.

By using the foregoing method, a social network application server is integrated into an information process before an amount of resource is transferred, which implements rapid and convenient offline resource transfer with the assistance of the social network application server and a social network application identifier, and greatly improves the processing speed and efficiency.

Figure 4:
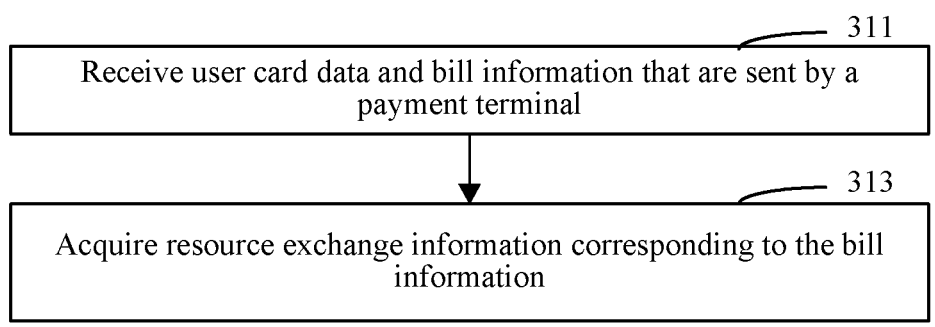
FIG. 4 is a flowchart of a method for obtaining resource exchange information and user card data by using a payment terminal in FIG. 3.

As shown in FIG. 4, in some embodiments, the foregoing step 310 performed by the server 20 further includes:

Step 311: Receive the user card data and bill information that are sent by the payment terminal.

In this embodiment, the payment terminal obtains the user card data by reading from a corresponding user card, and the payment terminal obtains the bill information through a user input operation on the payment terminal.

Step 313: Acquire resource exchange information corresponding to the bill information.

In this embodiment, because both the bill information and the resource exchange information are corresponding to a resource transfer operation triggered by a current user, the resource exchange information corresponding to the bill information is acquired from an access server according to the bill information.

In some embodiments, before step 310, the foregoing method further includes the following step: obtaining, by the payment terminal, the user card data and the bill information from the user card, and sending the user card data and the bill information.

In this embodiment, the user card 5 is a contactless smart card (e.g., a central processing unit (CPU) card). The CPU card includes a file folder for storing files used for supporting offline mobile payments. A purchase secure access module (PSAM) card is located inside the payment terminal, and various keys for operating the user card are stored in the PSAM card.

Further, both the user card and the PSAM card located inside the payment terminal store a master key and a channel key. The master key is used by the two cards to authenticate each other and the channel key is used by them to encrypt the communication therebetween. When the user card gets close to the payment terminal, mutual authentication between the user card and the PSAM card is first performed by using the master key and the channel key, so as to establish an encrypted transmission channel. Then, the payment terminal reads stored data from the user card through the established encrypted transmission channel, so as to obtain the user card data. Then, the user card data and the bill information are sent to the server according to the bill information created according to the input operation on the payment terminal. After the data in the user card is read, the user card can leave the payment terminal. In a specific implementation, the server is the access server.

Figure 5:
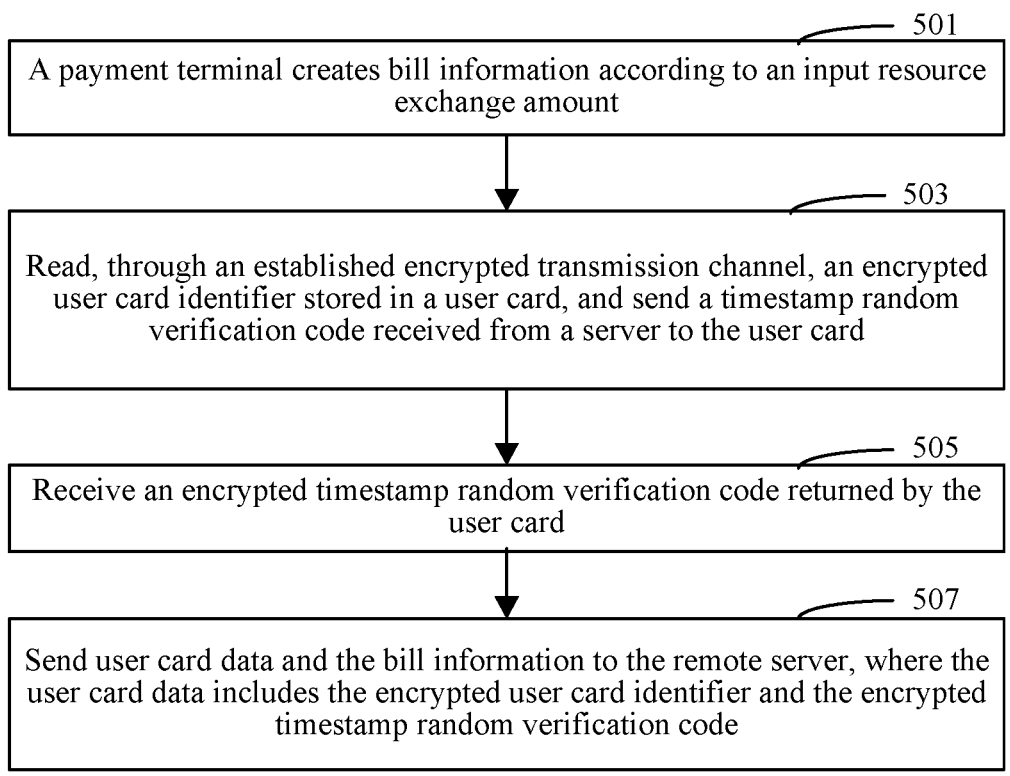
FIG. 5 is a flowchart of a method in which a payment terminal obtains user card data and bill information from a user card, and sends the user card data and the bill information according to some embodiments.

As shown in FIG. 5, in some embodiments, the step of obtaining, by the payment terminal, the user card data and the bill information from the user card, and sending the user card data and the bill information includes:

Step 501: The payment terminal creates the bill information according to an input resource exchange amount.

In this embodiment, the resource exchange amount is a bill amount input by a merchant, that is, a current amount of resource to be transferred.

Step 503: Read, through an established encrypted transmission channel, an encrypted user card identifier stored in the user card, and send a timestamp random verification code received from a server to the user card.

In this embodiment, the encrypted transmission channel is established in advance through mutual authentication between the user card and the PSAM card located inside the payment terminal, so that the encrypted user card identifier in the user card is read through the encrypted transmission channel using a data reading key, where the data reading key is separately stored in the user card and the PSAM card. The user card identifier may be encrypted by using an international data encryption (IDE) key.

The payment terminal receives the timestamp random verification code delivered by the server regularly, and sends the timestamp random verification code to the user card. The timestamp random verification code is randomly delivered by the server according to a preset time interval, for example, the time interval may be 1 minute, that is, the timestamp random verification code is delivered to the payment terminal every 1 minute. In a specific implementation, the server delivering the timestamp random verification code is a social network application server.

Step 505: Receive an encrypted timestamp random verification code returned by the user card.

In this embodiment, after receiving the timestamp random verification code sent by the payment terminal, the user card encrypts the received timestamp random verification code and returns an encrypted timestamp random verification code to the payment terminal. In a preferred embodiment, the timestamp random verification code may be encrypted by using a public key encryption (ChK) key, the ChK key is separately stored in the user card and the social network application server, and a ChK key stored in each user card differs from the ChK keys stored in the other user cards.

Step 507: Send the user card data and the bill information to the remote server, where the user card data includes the encrypted user card identifier and the encrypted timestamp random verification code.

In this embodiment, because both the encrypted user card identifier and the encrypted timestamp random verification code indicate the uniqueness of the user card, the encrypted user card identifier and the encrypted timestamp random verification code form the user card data, and the user card data is sent to the server.

Figure 6:
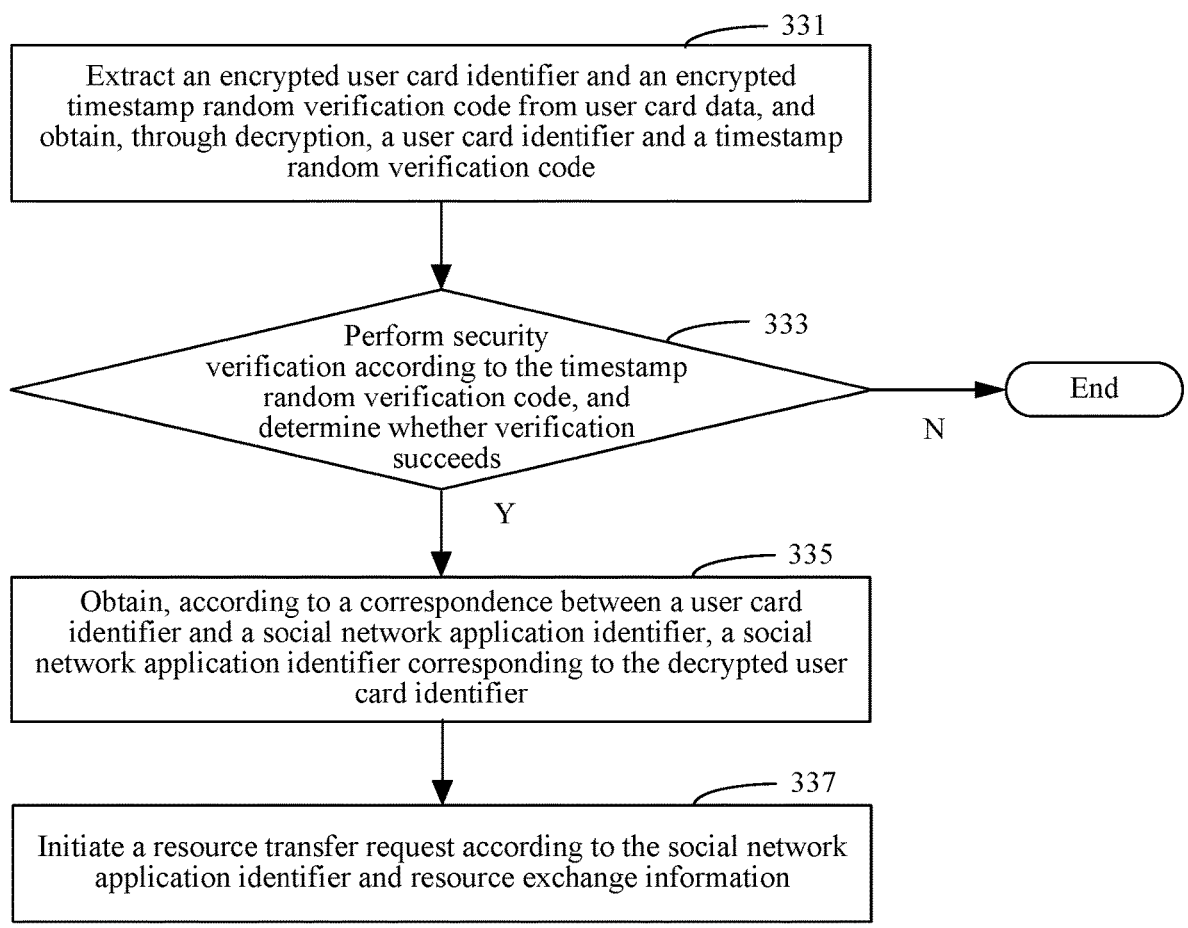
FIG. 6 is a flowchart of a method in which security verification is performed according to user card data, a corresponding social network application identifier is obtained according to the user card data when verification succeeds, and a resource transfer request is initiated according to the social network application identifier and resource exchange information according to some embodiments.

As shown in FIG. 6, in some embodiments, the foregoing step 330 further includes:

Step 331: Extract an encrypted user card identifier and an encrypted timestamp random verification code from the user card data, and obtain, through decryption, a user card identifier and a timestamp random verification code.

In this embodiment, the social network application server extracts the encrypted user card identifier and the encrypted timestamp random verification code from the received user card data, decrypts the encrypted user card identifier by using an IDE key, and decrypts the encrypted timestamp random verification code by using a ChK key. In a specific implementation, the IDE key is stored in the social network application server, and the ChK key is separately stored in the user card and the social network application server.

The user card data and the timestamp random verification code are encrypted by using different keys, that is, each type of key can only perform a specific function, thereby ensuring the independence of the key, further improving the security of data, and effectively avoiding occurrence of a data tampering event.

Step 333: Perform security verification according to the timestamp random verification code, and determine whether verification succeeds; if verification succeeds (Y), perform step 335, and if verification fails (N), end the process.

In this embodiment, it is determined whether the timestamp random verification code obtained through decryption is consistent with a timestamp random verification code delivered by a server, if the timestamp random verification code obtained through decryption is consistent with the timestamp random verification code delivered by the server, verification succeeds, indicating that the user card is an authorized user card, which ensures high security by means of timestamp random verification code.

Step 335: Obtain, according to a correspondence between a user card identifier and a social network application identifier, a social network application identifier corresponding to the decrypted user card identifier.

In this embodiment, the correspondence between the user card identifier and the social network application identifier stored in the server is obtained, so that the social network application identifier corresponding to the decrypted user card identifier is obtained according to the correspondence. The social network application identifier is associated with certain resource transfer account information, and can be used for implementing a resource transfer operation that currently occurs.

Step 337: Initiate a resource transfer request according to the social network application identifier and the resource exchange information.

In this embodiment, the resource transfer request is submitted to a resource transfer server according to the social network application identifier and the resource exchange information, and the resource exchange information indicates a resource transfer amount.

In another embodiment, after step 350, the foregoing method further includes: receiving, by the payment terminal, generated processing state information, and updating a resource exchange state according to the processing state information.

In this embodiment, the resource exchange state includes a goods shipped state, a goods not-yet-shipped state, and the like. After receiving the generated processing state information about a resource transfer success or failure, the payment terminal correspondingly modifies the resource exchange state, for example, the resource exchange state is modified to be the goods shipped state according to the processing state information about the resource transfer success, or the resource exchange state is modified to be the goods not-yet-shipped state according to the processing state information about the resource transfer failure.

The resource transfer operation of the user is implemented by using the foregoing method; in this case, a merchant receives payment made by the user by performing the resource transfer operation, and can actually receive the money only after a settlement cycle expires, which reserves time for events that are possible to occur, such as a user complaint, and greatly improves the security.

Figure 7:
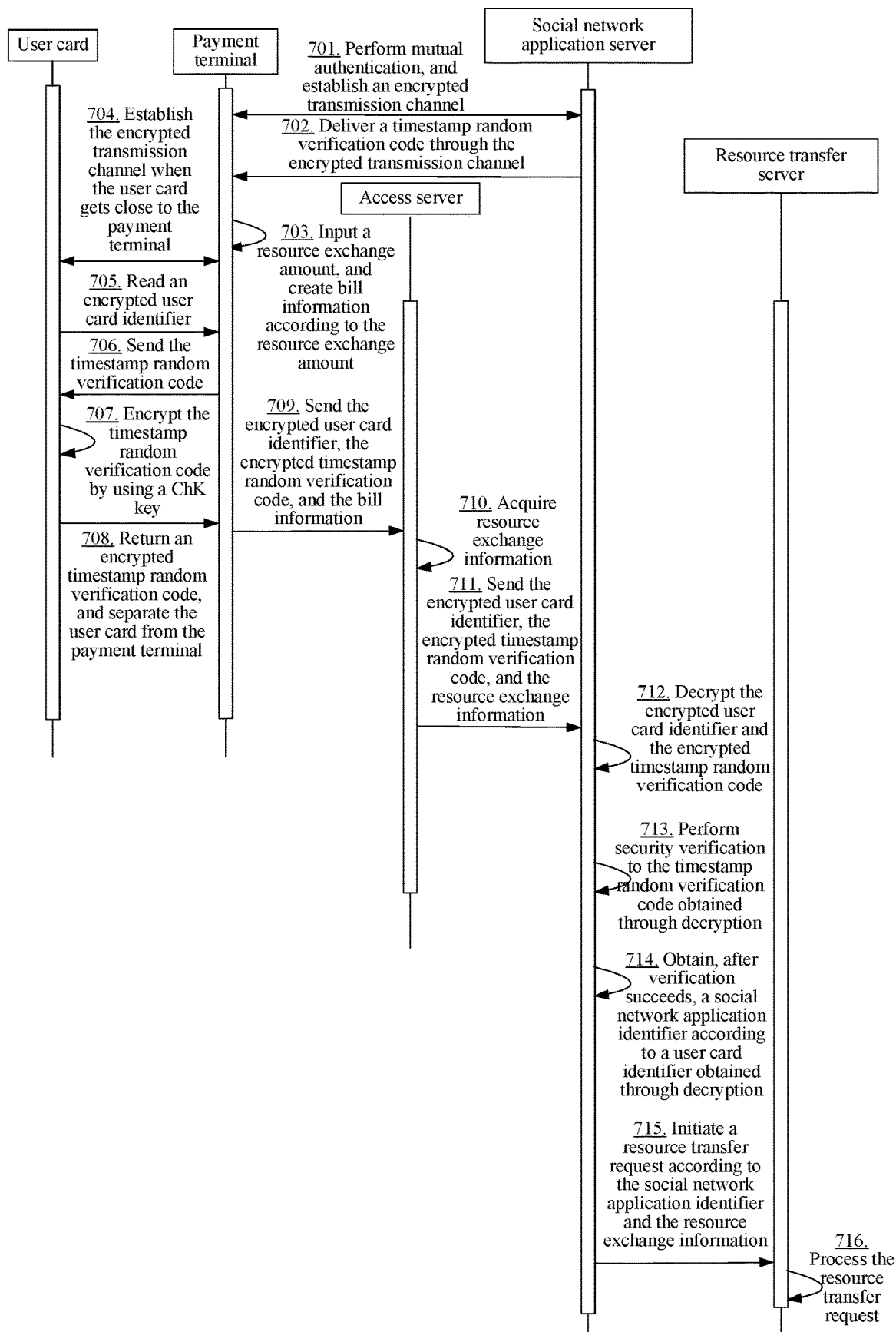
FIG. 7 is a sequence diagram of a method for processing resource exchange information according to some embodiments.

As an application scenario, FIG. 7 shows a complete process of a method for processing resource exchange information in a specific implementation.

When a payment terminal is powered on, step 701 is performed, to accomplish mutual authentication between the payment terminal and a social network application server by using a card application security (Cld) master key and a Cld channel key, and establish an encrypted transmission channel over a network. The social network application server performs step 702 to deliver a timestamp random verification code according to a preset time interval, where a timestamp random verification code delivered each time is different.

When a user purchases goods from a merchant and needs to perform resource transfer, the payment terminal performs step 703 to allow a merchant to manually input a resource exchange amount, so as to create bill information, and waits a user card to get close to the payment terminal.

When the user card gets close to the payment terminal, step 704 is performed to accomplish mutual authentication between the user card and a PSAM card located inside the payment terminal and establish an encrypted transmission channel therebetween by using a master key and a channel key.

The payment terminal performs step 705 to read an encrypted user card identifier from the user card through the established encrypted transmission channel, and performs step 706 to send, to the user card, the latest timestamp random verification code delivered by the social network application server. After receiving the timestamp random verification code, the user card performs step 707 to encrypt the timestamp random verification code by using a ChK key, so as to return an encrypted timestamp random verification code to the payment terminal by performing step 708.

In this case, the payment terminal generates a prompt tone, to prompt the user to remove the user card from the payment terminal and take the user card back.

The encrypted user card identifier and the encrypted timestamp random verification code form the user card data, and the payment terminal sends the user card data and the bill information to an access server by performing step 709. In this case, the access server performs step 710 and step 711 to obtain resource exchange information according to the bill information, and send the user card data and the resource exchange information to the social network application server.

The social network application server performs step 712 to decrypt the encrypted user card identifier and the encrypted timestamp random verification code that are in the user card data, and performs step 713 to perform security verification to the timestamp random verification code obtained through decryption, to determine whether the user card is an authorized user card. If the user card is an authorized user card, the social network application server performs step 714 and step 715 to obtain a social network application identifier corresponding to the user card and initiate a request to a resource transfer server according to the social network application identifier and the resource exchange information; and the resource transfer server then performs step 716 to process the resource transfer request.

Figure 8:
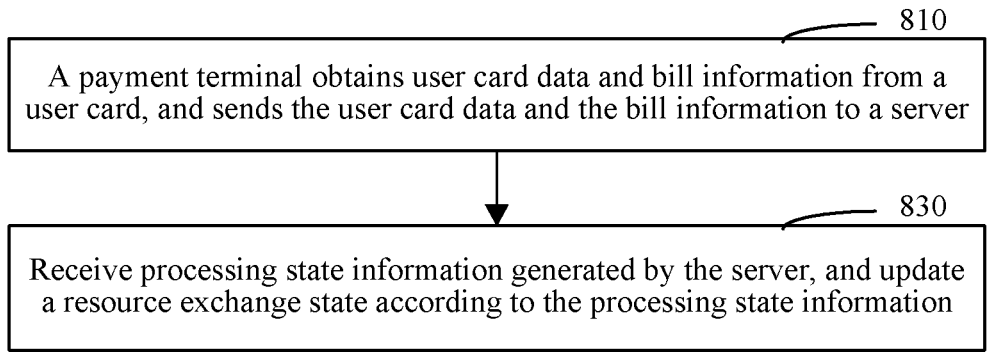
FIG. 8 is a flowchart of a method for processing resource exchange information according to some embodiments.

As shown in FIG. 8, in some embodiments, a method performed by a payment terminal for processing resource exchange information includes the following steps:

Step 810: The payment terminal obtains user card data and bill information from a user card, and sends the user card data and the bill information to a server.

Step 830: Receive processing state information generated by the server, and update a resource exchange state according to the processing state information.

The foregoing steps are performed in the payment terminal, and the processing state information is generated by the server for processing a resource transfer request.

The resource transfer request is initiated according to a social network application identifier and resource exchange information corresponding to the bill information after the server performs security verification according to the user card data, and obtains, according to the user card data when verification succeeds, the social network application identifier in a correspondence.

Figure 9:
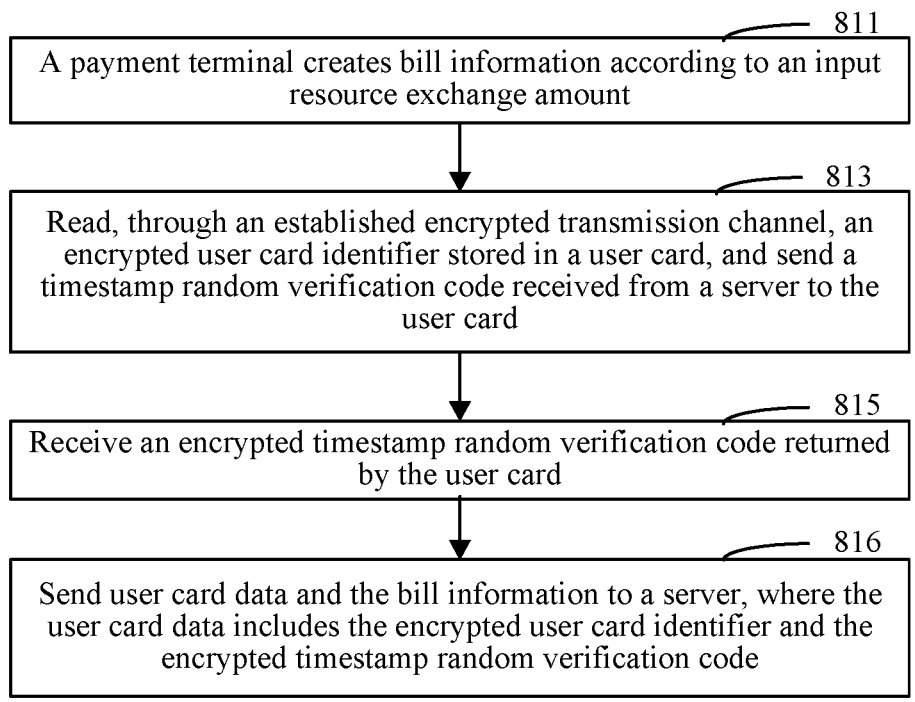
FIG. 9 is a flowchart of a method in which a payment terminal obtains user card data and bill information from a user card, and sends the user card data and the bill information to a server.

As shown in FIG. 9, in some embodiments, the foregoing step 810 includes:

Step 811: The payment terminal creates the bill information according to an input resource exchange amount.

Step 813: Read, through an established encrypted transmission channel, a user card identifier stored in the user card, and send a timestamp random verification code received from a server to the user card.

Step 815: Receive an encrypted timestamp random verification code returned by the user card.

Step 816: Send the user card data and the bill information to the server, where the user card data includes an encrypted user card identifier and the encrypted timestamp random verification code.

Figure 10:
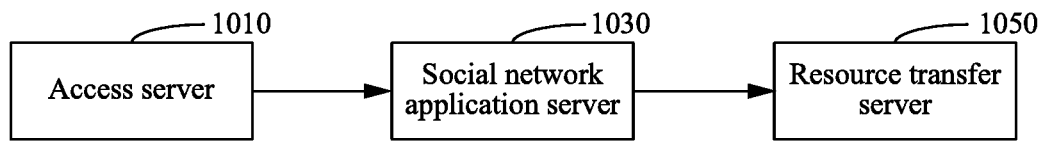
FIG. 10 is a schematic structural diagram of a system for processing resource exchange information according to some embodiments.

As shown in FIG. 10, in some embodiments, a computer system for processing resource exchange information includes an access server 1010, a social network application server 1030, and a resource transfer server 1050.

The access server 1010 is configured to obtain user card data and resource exchange information from a payment terminal.

In this embodiment, from the payment terminal, the access server 1010 acquires the user card data and the resource exchange information, where the user card data is used for uniquely identifying a user card and ensuring authority of the user card, and the resource exchange information includes corresponding merchant information, goods information, transaction information, and the like when a resource transfer operation is performed by a user, and is obtained according to information provided by the payment terminal and goods information input when the user triggers the resource transfer operation.

The social network application server 1030 is configured to perform security verification according to the user card data, obtain, according to the user card data when verification succeeds, a corresponding social network application identifier, and initiate a resource transfer request according to the social network application identifier and the resource exchange information.

In this embodiment, the social network application server 1030 performs security verification, so as to determine a corresponding user card is an authorized user card. If the social network application server 1030 determines that the user card is an authorized user card, the social network application server 1030 acquires, according to the user card data, a corresponding social network application identifier to the user card, and then initiates a resource transfer request to the resource transfer server 1050 according to the social network application identifier and the resource exchange information.

Further, each user card is uniquely corresponding to a social network application identifier, and the correspondence thereof is stored in the social network application server 1030.

In a preferred embodiment, the user card data includes a user card identifier, and a two-dimensional code corresponding to the user card identifier is preset for the user card. Before using the user card for the first time, the user uses a social network application running in a mobile phone to scan the two-dimensional code, so as to associate the user card with the social network application identifier of the user, establish a correspondence between the user card identifier and the social network application identifier of the user, and store the correspondence in the social network application server 1030.

The resource transfer server 1050 is configured to process the resource transfer request, to generate corresponding processing state information.

In this embodiment, the resource transfer server 1050 processes, according to the social network application identifier and the resource exchange information, the resource transfer request initiated by the social network application server 1030, and generates corresponding processing state information as the processing is completed. The processing state information includes resource transfer success information or resource transfer failure information.

By using the foregoing system, the social network application server 1030 is integrated into an information process before an amount of resource is transferred, which implements rapid and convenient offline resource transfer with the assistance of the social network application server 1030 and a social network application identifier, and greatly improves the processing speed and efficiency.

Figure 11:
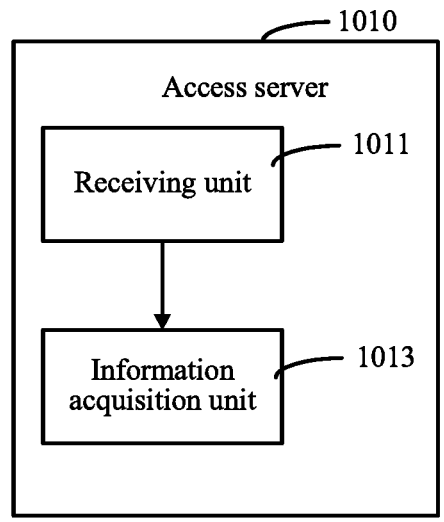
FIG. 11 is a schematic structural diagram of an access server in FIG. 10.

As shown in FIG. 11, in some embodiments, the access server 1010 includes a receiving unit 1011 and an information acquisition unit 1013.

The receiving unit 1011 is configured to receive the user card data and bill information that are sent by the payment terminal.

In this embodiment, the payment terminal obtains the user card data by reading from a user card, and the payment terminal obtains the bill information through a user input operation on the payment terminal.

The information acquisition unit 1013 is configured to acquire resource exchange information corresponding to the bill information.

In this embodiment, because both the bill information and the resource exchange information are corresponding to a resource transfer operation triggered by a current user, the information acquisition unit 1013 acquires resource exchange information corresponding to the bill information from the access server 1010 according to the bill information.

Figure 12:
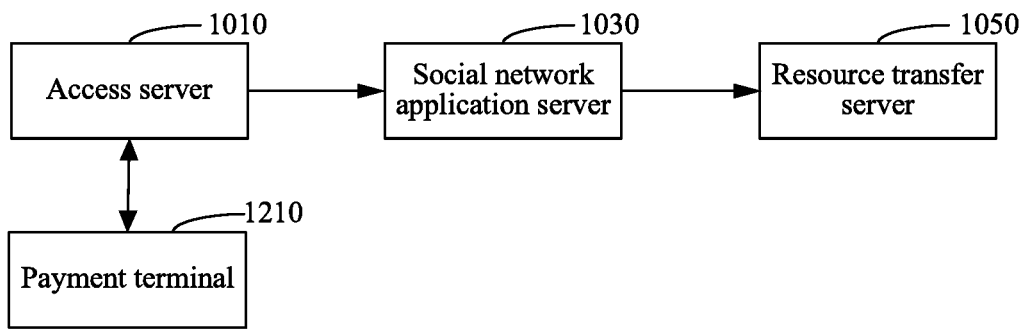
FIG. 12 is a schematic structural diagram of a system for processing resource exchange information according to some embodiments.

As shown in FIG. 12, in another embodiment, the foregoing system further includes a payment terminal 1210. The payment terminal 1210 is configured to obtain user card data and bill information from a user card, and send the user card data and the bill information to the access server 1010.

In this embodiment, the user card is a contactless smart card. A PSAM card is located inside the payment terminal 1210, and the PSAM card stores various keys for operating the user card.

Further, both the user card and the PSAM card that is located inside the payment terminal 1210 store a master key and a channel key. When the user card gets close to the payment terminal 1210, mutual authentication between the user card and the PSAM card is first performed by using the master key and the channel key, so as to establish an encrypted transmission channel. Then, the payment terminal 1210 reads stored data from the user card through the established encrypted transmission channel, so as to obtain the user card data. Then, the user card data and the bill information are sent to the access server 1010 according to the bill information created according to the input operation on the payment terminal 1210. After the data in the user card is read, the user card can leave the payment terminal 1210.

As shown in FIG. 13, in some embodiments, the foregoing payment terminal 1210 includes a bill creating unit 1211, a reading unit 1213, a verification code receiving unit 1215, and a payment terminal sending unit 1217.

The bill creating unit 1211 is configured to create the bill information according to an input resource exchange amount.

In this embodiment, the resource exchange amount is a bill amount input by a merchant, that is, a current amount of resource to be transferred.

The reading unit 1213 is configured to read, through an established encrypted transmission channel, an encrypted user card identifier stored in the user card, and send a timestamp random verification code received from the social network application server to the user card.

In this embodiment, the encrypted transmission channel is established in advance through mutual authentication between the user card and a PSAM card that is located inside the payment terminal 1210, so that the reading unit 1213 reads the encrypted user card identifier in the user card through the encrypted transmission channel, where the user card identifier may be encrypted by using an IDE key, and the IDE key is separately stored in the user card and the PSAM card.

The payment terminal 1210 receives the timestamp random verification code delivered by the social network application server 1030, and sends the timestamp random verification code to the user card. The timestamp random verification code is randomly delivered by the social network application server 1030 according to a preset time interval, for example, the time interval may be 1 minute, that is, the timestamp random verification code is delivered to the payment terminal 1210 every 1 minute.

The verification code receiving unit 1215 is configured to receive an encrypted timestamp random verification code returned by the user card.

In this embodiment, after receiving the timestamp random verification code sent by the payment terminal 1210, the user card encrypts the received timestamp random verification code and returns an encrypted timestamp random verification code to the payment terminal 1210. In a preferred embodiment, the timestamp random verification code may be encrypted by using a public key encryption (ChK) key, the ChK key is separately stored in the user card and the social network application server 1030, and a ChK key stored in each user card in user cards differs from one another.

The payment terminal sending unit 1217 is configured to send the user card data and the bill information to the access server, where the user card data includes the encrypted user card identifier and the encrypted timestamp random verification code.

In this embodiment, because both the encrypted user card identifier and the encrypted timestamp random verification code indicate the uniqueness of the user card, the payment terminal sending unit 1217 forms the user card data by using the encrypted user card identifier and the encrypted timestamp random verification code, and sends the user card data to the access server.

As shown in FIG. 14, in some embodiments, the social network application server 1030 includes a decryption processing unit 1031, a security verification unit 1033, an identifier acquisition unit 1035, and a request initiation unit 1037.

The decryption processing unit 1031 is configured to extract an encrypted user card identifier and an encrypted timestamp random verification code from the user card data, and obtain, through decryption, a user card identifier and a timestamp random verification code.

In this embodiment, the decryption processing unit 1031 in the social network application server 1030 extracts the encrypted user card identifier and the encrypted timestamp random verification code from the received user card data, decrypts the encrypted user card identifier by using an IDE key, and decrypts the encrypted timestamp random verification code by using a ChK key, where the IDE key is stored in the social network application server, and the ChK key is separately stored in the user card and the social network application server.

The user card data and the timestamp random verification code are encrypted by using different keys, that is, each type of key can only perform a specific function, thereby ensuring the independence of the key, further improving the security of data, and effectively avoiding occurrence of a data tampering event.

The security verification unit 1033 is configured to perform security verification according to the timestamp random verification code, and determine whether verification succeeds; if verification succeeds, the identifier acquisition unit 1035 is notified, and if verification fails, execution is stopped.

In this embodiment, the security verification unit 1033 determines whether the timestamp random verification code obtained through decryption is consistent with the timestamp random verification code delivered by the social network application server 1030, if the timestamp random verification code obtained through decryption is consistent with the timestamp random verification code delivered by the social network application server 1030, verification succeeds, indicating that the user card is an authorized user card, which ensures high security by means of timestamp random verification code.

The identifier acquisition unit 1035 is configured to obtain, according to a correspondence between a user card identifier and a social network application identifier, a social network application identifier corresponding to the decrypted user card identifier.

In this embodiment, the identifier acquisition unit 1035 obtains the correspondence between the user card identifier and the social network application identifier and stored in the social network application server, so as to obtain, according to the correspondence, the social network application identifier corresponding to the decrypted user card identifier. The social network application identifier is associated with certain resource transfer account information, and can be used for implementing a resource transfer operation that currently occurs.

The request initiation unit 1037 is configured to initiate a resource transfer request to the resource transfer server 1050 according to the social network application identifier and resource exchange information.

In this embodiment, the request initiation unit 1037 initiates the resource transfer request to the resource transfer server 1050 according to the social network application identifier and the resource exchange information, where the resource exchange information indicates a resource transfer amount.

In another embodiment, the payment terminal 1210 is further configured to receive generated processing state information, and update a resource exchange state according to the processing state information.

In this embodiment, the resource exchange state includes a goods shipped state, a goods not-yet-shipped state, and the like. After receiving generated processing state information about a resource transfer success or failure, the payment terminal 1210 correspondingly modifies the resource exchange state, for example, the resource exchange state is modified to the goods shipped state according to the processing state information about the resource transfer success, or the resource exchange state is modified to the goods not-yet-shipped state according to the processing state information about the resource transfer failure.

The resource transfer operation of the user is implemented by using the foregoing system; in this case, a merchant receives payment made by the user by performing resource transfer, and can actually receive the money only after a settlement cycle expires, which reserves time for events that are possible to occur, such as a user complaint, and greatly improves the security.

Figure 15:
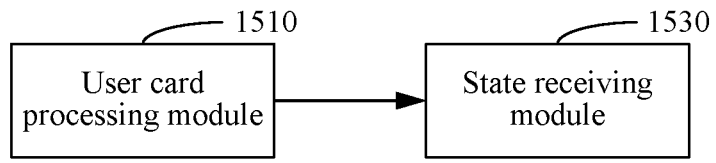
FIG. 15 is a schematic structural diagram of a system for processing resource exchange information according to some embodiments.

As shown in FIG. 15, in some embodiments, a system for processing resource exchange information, running in a payment terminal, includes a user card processing module 1510 and a state receiving module 1530.

The user card processing module 1510 is configured to obtain user card data and bill information from a user card, and send the user card data and the bill information to a server.

The state receiving module 1530 is configured to receive processing state information generated by the server, and update a resource exchange state according to the processing state information.

The foregoing steps are performed in the payment terminal, and the processing state information is generated by processing a resource transfer request by the server.

The resource transfer request is initiated according to a social network application identifier and resource exchange information corresponding to the bill information after the server performs security verification according to the user card data, and obtains, according to the user card data when verification succeeds, the social network application identifier in a correspondence.

Figure 16:
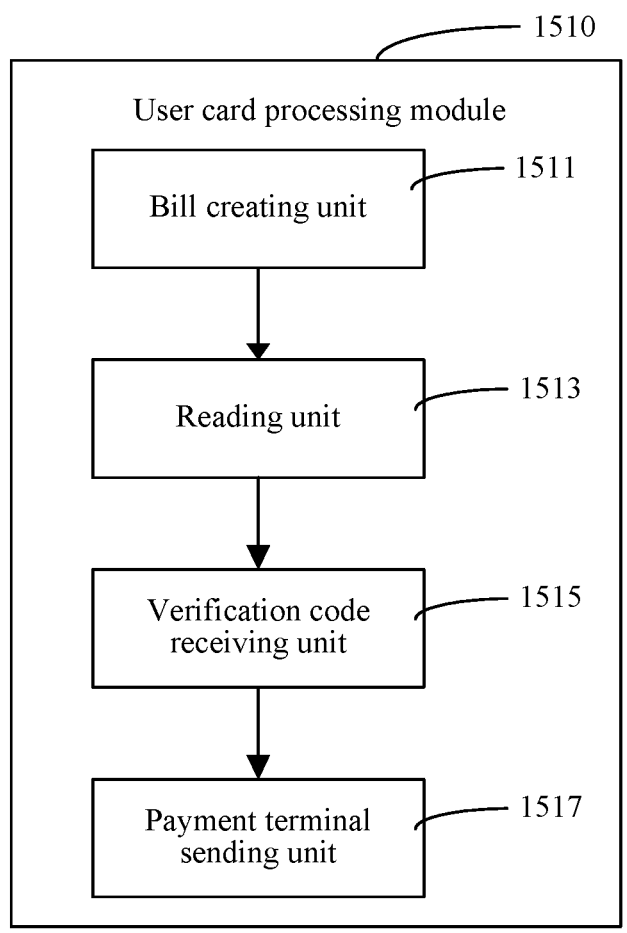
FIG. 16 is a schematic structural diagram of a user card processing module in FIG. 15.

As shown in FIG. 16, in some embodiments, the user card processing module 1510 includes a bill creating unit 1511, a reading unit 1513, a verification code receiving unit 1515, and a payment terminal sending unit 1517.

The bill creating unit 1511 is configured to create the bill information according to an input resource exchange amount.

The reading unit 1513 is configured to read, through an established encrypted transmission channel, an encrypted user card identifier stored in the user card, and send a timestamp random verification code received from a server to the user card.

The verification code receiving unit 1515 is configured to receive an encrypted timestamp random verification code returned by the user card.

The payment terminal sending unit 1517 is configured to send the user card data and the bill information to a server, where the user card data includes the encrypted user card identifier and the encrypted timestamp random verification code.

Figure 17:
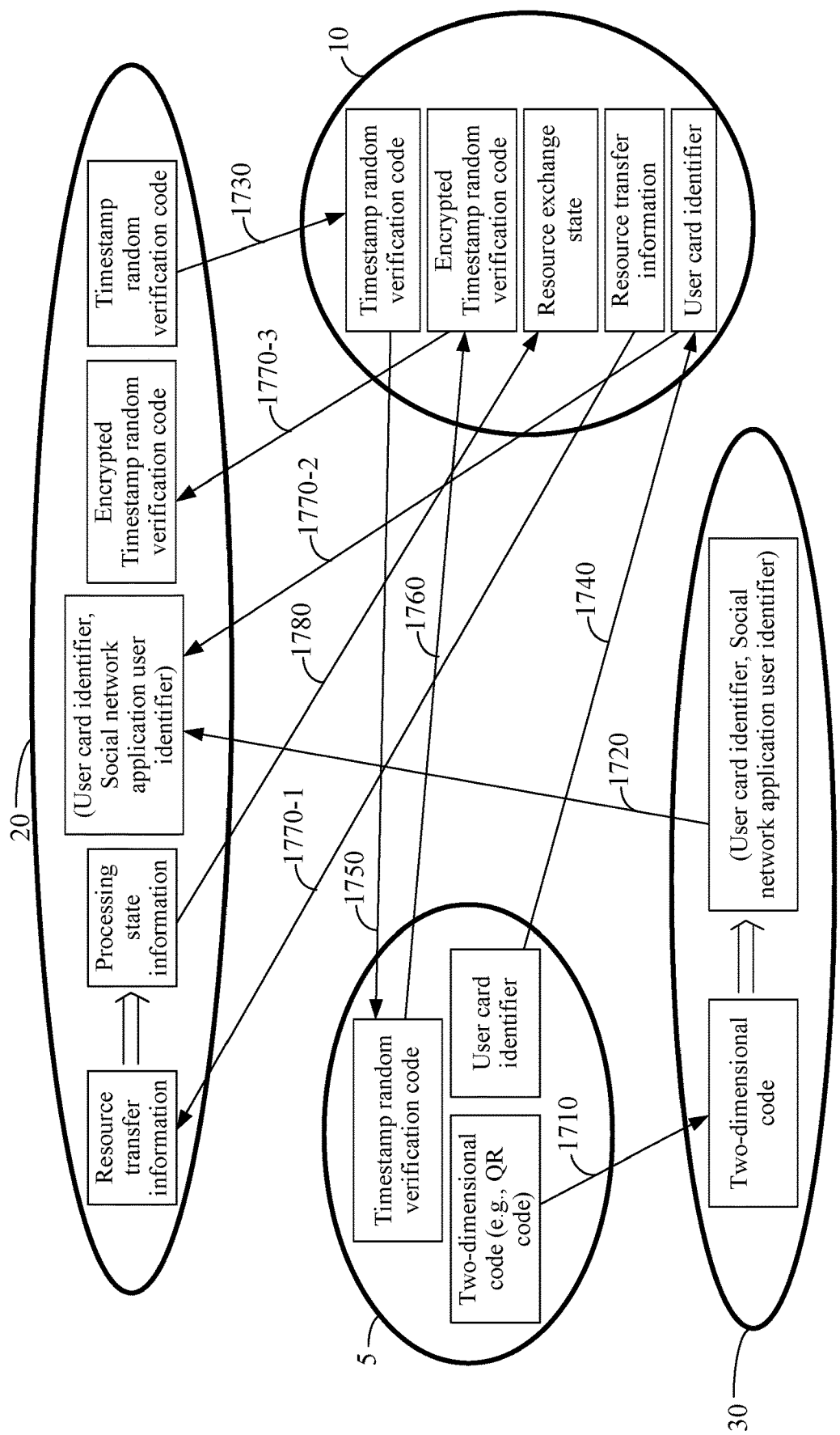
FIG. 17 is a schematic diagram of the flow of information exchanged between different entities in connection with resource transfer according to some embodiments.

FIG. 17 is a schematic diagram of the flow of information exchanged between different entities in connection with resource transfer according to some embodiments. The resource transfer involves a user card 5, a payment terminal 10, a computer server 20, and a mobile phone 30. First, the user of the mobile 30 obtains the user card identifier of the user card 5 by scanning (1710) a two-dimensional code (e.g., a QR code) associated with the user card 50 using a social network application running in the mobile phone 30. The mobile phone 30 then extracts the user card identifier from the two-dimensional code according to a predefined algorithm implemented by the social network application. The social network application running in the mobile phone 30 has a social network application user identifier that uniquely identifies the mobile phone (and the user of the mobile) at the server 20. Next, the mobile phone 30 generates a correspondence between the user card identifier and the social network application user identifier and sends (1720) the correspondence to the server 20. As noted above, the two operations above happens when the mobile phone 30 is in an online state so that it can communicate with the server 20.

Separately, the server 20 sends (1730) a timestamp random verification code to the payment terminal 10 at a regular interval (e.g., once every minute) after performing mutual authentication with the payment terminal 10 and establishing an encrypted transmission channel therebetween. In some embodiments, the payment terminal 10 only keeps one timestamp random verification code that is unique to the payment terminal for a while until it receives the next one for replacing the current one. When the user card 5 approaches the payment terminal 10 to initiate a resource transfer through the payment terminal 10, the payment terminal first performs mutual authentication with the user card 5 and establishes an encrypted transmission channel therebetween using predefined encryption keys. Next, the payment terminal 10 receives (1740) user card data (e.g., an encrypted user card identifier) from the user card 5 and returns (1750) the current timestamp random verification code to the user card 5. The user card 5 then uses another encryption key provided by the server 20 to encrypt the timestamp random verification code and returns (1760) the encrypted timestamp random verification code to the payment terminal 10.

The payment terminal 10 receives a user input on the resource transfer amount through its I/O and generates resource transfer information. Next, the payment terminal 10 sends the resource transfer information (1770-1), the encrypted user card identifier (1770-2), and the encrypted timestamp random verification code (1770-3) to the server 20 in the form of one or more data packets. The server 20 then processes the received data in connection with the resource transfer request and generates processing state information, which indicates whether the resource transfer succeeds or not. Finally, the server 20 returns (1780) the processing state information to the payment terminal 10. The payment terminal 10 then converts the processing state information into resource exchange state, which is to be displayed on the screen of the payment terminal 10.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising" when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing resource exchange information implemented by a distributed system comprising an access server, a social network application server coupled to the access server, a resource server, a payment terminal, a mobile phone, and a user card, the method comprising:
  obtaining, by the access server and from the mobile phone, a data package including a user card identifier and a social network application identifier by scanning the user card using a social network application running on the mobile phone, wherein the user card includes information corresponding to the user card identifier, and wherein the social network application includes information corresponding to the social network application identifier;
  establishing, by the social network application server, a correspondence between the user card identifier and the social network application identifier and storing the correspondence in the social network application server;
  obtaining, by the access server and from the payment terminal, a resource transfer request, wherein the resource transfer request is initiated by pairing the user card with the payment terminal, wherein the resource transfer request comprises user card data and resource exchange information, and wherein the user card data includes an encrypted copy of the user card identifier, further including:
    sending, by the user card, the encrypted copy of the user card identifier to the payment terminal;
    receiving, by the user card, a timestamp random verification code from the payment terminal, wherein the timestamp random verification code was generated by the access server and sent by the access server to the payment terminal and the social network application server, respectively; and
    sending, by the user card, an encrypted copy of the timestamp random verification code to the payment terminal, wherein the user card generates the encrypted timestamp random verification code by encrypting the received timestamp random verification code;
  performing, by the social network application server, security verification to the user card data and obtaining the corresponding social network application identifier to the user card identifier included in the user card data when the security verification succeeds, further including:
    sending, by the access server, the encrypted user card identifier and the encrypted timestamp random verification code to the social network application server;
    decrypting, by the social network application server, the encrypted user card identifier and the encrypted timestamp random verification code;
    performing, by the social network application server, the security verification to the decrypted timestamp random verification code by comparing the decrypted timestamp random verification code with the timestamp random verification code generated by the access server; and
    in accordance with a determination that the security verification succeeds, obtaining, by the social network application server, the social network application identifier corresponding to the decrypted user card identifier;

processing, by the resource transfer server, the resource transfer request according to the social network application identifier and the resource exchange information to generate corresponding processing state information; and returning, by the resource transfer server, the corresponding processing state information to the payment terminal.

2. The method of claim 1, wherein scanning the user card using the social network application running on the mobile phone comprises scanning a two-dimensional code corresponding to the user card and extracting the user card identifier from the two-dimensional code.

3. The method of claim 2, wherein pairing the user card with the payment terminal is performed via an encrypted transmission channel established between the payment terminal and the user card using an encryption key when the user card is within a predefined distance from the payment terminal.

4. The method of claim 1, further comprising:
before obtaining the data package by the access server and from the mobile phone:
performing, by the access server, mutual authentication with the payment terminal; and
establishing, by the access server, an encrypted transmission channel with the payment terminal using an encryption key.

5. The method of claim 1, wherein the timestamp random verification code is first sent to the payment terminal via a first encrypted transmission channel between the access server and the payment terminal and then to the user card via a second encrypted transmission channel between the payment terminal and the user card, and the user card encrypts the timestamp random verification code into the encrypted timestamp random verification code using an encryption key provided by the access server.

6. The method of claim 5, wherein the first encrypted transmission channel and the second encrypted transmission channel and encrypted using two different encryption keys.

7. The method of claim 5, wherein the timestamp random verification code is transmitted to the payment terminal via the first encrypted transmission channel at a predefined time interval.

8. The method of claim 1, further comprising:
returning, by the resource transfer server, the corresponding processing state information to the mobile phone when the mobile phone is in an online state.

9. A computer system comprising:
one or more processors;
memory;
one or more program modules stored in the memory and to be executed by a distributed system comprising an access server, a social network application server coupled to the access server, a resource server, a payment terminal, a mobile phone, and a user card, the one or more program modules further including instructions for:
obtaining, by the access server and from the mobile phone, a data package including a user card identifier and a social network application identifier by scanning the user card using a social network application running on the mobile phone, wherein the user card includes information corresponding to the user card identifier, and wherein the social network application includes information corresponding to the social network application identifier;

establishing, by the social network application server, a correspondence between the user card identifier and the social network application identifier and storing the correspondence in the social network application server;

obtaining, by the access server and from the payment terminal, a resource transfer request, wherein the resource transfer request is initiated by pairing the user card with the payment terminal, wherein the resource transfer request comprises user card data and resource exchange information, and wherein the user card data includes an encrypted copy of the user card identifier, further including:
sending, by the user card, the encrypted copy of the user card identifier to the payment terminal;
receiving, by the user card, a timestamp random verification code from the payment terminal, wherein the timestamp random verification code was generated by the access server and sent by the access server to the payment terminal and the social network application server, respectively; and
sending, by the user card, an encrypted copy of the timestamp random verification code to the payment terminal, wherein the user card generates the encrypted timestamp random verification code by encrypting the received timestamp random verification code;

performing, by the social network application server, security verification to the user card data and obtaining the corresponding social network application identifier to the user card identifier included in the user card data when the security verification succeeds, further including;
sending, by the access server, the encrypted user card identifier and the encrypted timestamp random verification code to the social network application server;
decrypting, by the social network application server, the encrypted user card identifier and the encrypted timestamp random verification code;
performing, by the social network application server, the security verification to the decrypted timestamp random verification code by comparing the decrypted timestamp random verification code with the timestamp random verification code generated by the access server; and
in accordance with a determination that the security verification succeeds, obtaining, by the social network application server, the social network application identifier corresponding to the decrypted user card identifier processing, by the resource transfer server, the resource transfer request according to the social network application identifier and the resource exchange information to generate corresponding processing state information; and returning, by the resource transfer server, the corresponding processing state information to the payment terminal.

10. The computer system of claim 9, wherein scanning the user card using the social network application running on the mobile phone comprises scanning a two-dimensional code corresponding to the user card and extracting the user card identifier from the two-dimensional code.

11. The computer system of claim 10, wherein pairing the user card with the payment terminal is performed via an encrypted transmission channel established between the payment terminal and the user card using an encryption key when the user card is within a predefined distance from the payment terminal.

12. The computer system of claim 9, wherein the one or more program modules further include instructions for:
before obtaining the data package by the access server and from the mobile phone:
performing, by the access server, mutual authentication with the payment terminal; and
establishing, by the access server, an encrypted transmission channel with the payment terminal using an encryption key.

13. The computer system of claim 9, wherein the one or more program modules further include instructions for:
returning, by the resource transfer server, the corresponding processing state information to the mobile phone when the mobile phone is in an online state.

14. A non-transitory computer readable medium storing one or more program modules, wherein the one or more program modules, when executed by a distributed system comprising an access server, a social network application server coupled to the access server, a resource server, a payment terminal, a mobile phone, and a user card, cause the distributed system to perform the following operations:
obtaining, by the access server and from the mobile phone, a data package including a user card identifier and a social network application identifier by scanning the user card using a social network application running on the mobile phone, wherein the user card includes information corresponding to the user card identifier, and wherein the social network application includes information corresponding to the social network application identifier;
establishing, by the social network application server, a correspondence between the user card identifier and the social network application identifier and storing the correspondence in the social network application server;
obtaining, by the access server and from the payment terminal, a resource transfer request, wherein the resource transfer request is initiated by pairing the user card with the payment terminal, wherein the resource transfer request comprises user card data and resource exchange information, and wherein the user card data includes an encrypted copy of the user card identifier, further including:
sending, by the user card, the encrypted copy of the user card identifier to the payment terminal;
receiving, by the user card, a timestamp random verification code from the payment terminal, wherein the timestamp random verification code was generated by the access server and sent by the access server to the payment terminal and the social network application server, respectively; and
sending, by the user card, an encrypted copy of the timestamp random verification code to the payment terminal, wherein the user card generates the encrypted timestamp random verification code by encrypting the received timestamp random verification code;
performing, by the social network application server, security verification to the user card data and obtaining the corresponding social network application identifier to the user card identifier included in the user card data when the security verification succeeds, further including:
sending, by the access server, the encrypted user card identifier and the encrypted timestamp random verification code to the social network application server;
decrypting, by the social network application server, the encrypted user card identifier and the encrypted timestamp random verification code;
performing, by the social network application server, the security verification to the decrypted timestamp random verification code by comparing the decrypted timestamp random verification code with the timestamp random verification code generated by the access server; and
in accordance with a determination that the security verification succeeds, obtaining, by the social network application server, the social network application identifier corresponding to the decrypted user card identifier;
processing, by the resource transfer server, the resource transfer request according to the social network application identifier and the resource exchange information to generate corresponding processing state information; and
returning, by the resource transfer server, the corresponding processing state information to the payment terminal.

15. The non-transitory computer readable medium of claim 14, wherein scanning the user card using the social network application running on the mobile phone comprises scanning a two-dimensional code corresponding to the user card and extracting the user card identifier from the two-dimensional code.

16. The non-transitory computer readable medium of claim 15, wherein pairing the user card with the payment terminal is performed via an encrypted transmission channel established between the payment terminal and the user card using an encryption key when the user card is within a predefined distance from the payment terminal.

17. The non-transitory computer readable medium of claim 14, wherein the one or more program modules further include instructions for:
before obtaining the data package by the access server and from the mobile phone:
performing, by the access server, mutual authentication with the payment terminal; and
establishing, by the access server, an encrypted transmission channel with the payment terminal using an encryption key.

* * * * *